United States Patent
Verma et al.

(10) Patent No.: US 11,816,548 B2
(45) Date of Patent: Nov. 14, 2023

(54) DISTRIBUTED LEARNING USING ENSEMBLE-BASED FUSION

(71) Applicant: International Business Machines Corporation, Armonk, NY (US)

(72) Inventors: Dinesh C. Verma, New Castle, NY (US); Supriyo Chakraborty, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 16/242,045

(22) Filed: Jan. 8, 2019

(65) Prior Publication Data

US 2020/0219014 A1     Jul. 9, 2020

(51) Int. Cl.
    *G06N 20/10*     (2019.01)

(52) U.S. Cl.
    CPC .................................. *G06N 20/10* (2019.01)

(58) Field of Classification Search
    CPC ....................................................... G06N 20/10
    See application file for complete search history.

(56) References Cited

U.S. PATENT DOCUMENTS

| | | | |
|---|---|---|---|
| 9,218,573 B1 | 12/2015 | Corrado et al. | |
| 9,514,389 B1 | 12/2016 | Erhan et al. | |
| 2017/0228642 A1 | 8/2017 | Danihelka et al. | |
| 2018/0018590 A1* | 1/2018 | Szeto | G06N 20/10 |
| 2018/0101529 A1 | 4/2018 | Karpistsenko et al. | |
| 2018/0314981 A1* | 11/2018 | Chen | G06F 9/5072 |
| 2020/0151575 A1* | 5/2020 | Cabrera Arevalo | G06N 3/084 |

OTHER PUBLICATIONS

Park et al., Data Synthesis based on Generative Adversarial Networks, Proceedings of the VLDB Endowment, vol. 11, No. 10, pp. 1071-1083, Aug. 2018. (Year: 2018).*
Cabrera Arevalo et al., U.S. Appl. No. 62/760,643 Specification, Provisional of 2020/0151575, Nov. 2018. (Year: 2018).*
Jeong et al., Communication-Efficient On-Device Machine Learning: Federated Distillation and Augmentation under Non-IID Private Data, Nov. 2018. (Year: 2018).*

(Continued)

*Primary Examiner* — Marshall L Werner
(74) *Attorney, Agent, or Firm* — Cantor Colburn LLP; Anthony Pallone

(57) ABSTRACT

Embodiments of the invention are directed to a computer-implemented method of distributed learning using a fusion-based approach. The method includes determining data statistics at each system node of a plurality of system nodes, wherein each system node respectively comprises an artificial intelligence model. The method further includes determining a set of control and coordination instructions for training each artificial intelligence model at each system node of the plurality of system nodes. The method further includes directing an exchange of data between the plurality of system nodes based on the data statistics of each system node of the plurality of system nodes. The method further includes fusing trained artificial intelligence models from the plurality of system nodes into a fused artificial intelligence model, wherein the trained artificial intelligence models are trained using the set of control and coordination instructions.

19 Claims, 5 Drawing Sheets

(56) References Cited

OTHER PUBLICATIONS

Hardy et al., MD-GAN: Multi-Discriminator Generative Adversarial Networks for Distributed Datasets, Nov. 9, 2018. (Year: 2018).*
Zhao et al., Federated Learning with Non-IID Data, Jun. 2018. (Year: 2018).*
Yu et al. Privacy-Preserving SVM Classification on Vertically Partitioned Data, Pacific-Asia Conference on Knowledge Discovery and Data Mining (PAKDD) 2006. (Year: 2006).*
Li et al. "A survey on wavelet applications in data mining." ACM SIGKDD Explorations Newsletter 4.2 (2002): 49-68.
Dam et al., "DXCS: an XCS system for distributed data mining." Proceedings of the 7th annual conference on Genetic and evolutionary computation. ACM, 2005.
Kussul et al. "High-performance intelligent computations for environmental and disaster monitoring." Int. J. Information Technologies & Knowledge 3.2 (2009): 135.
Lazarevic et al., "Boosting algorithms for parallel and distributed learning." Distributed and parallel databases 11.2 (2002): 203-229. (Related).
Obradovic et al. "Spatio-Temporal characterization of aerosols through active use of data from multiple sensors." In: Wagner W., Székely, B. (eds ): ISPRS TC VII Symposium—100 Years ISPRS, Vienna, Austria, Jul. 5-7, 2010, APRS, vol. XXXVIII, Part 7B2010.

* cited by examiner

DISTRIBUTED LEARNING USING ENSEMBLE-BASED FUSION

This invention was made with Government support under Contract No.: W911NF-16-3-0001 awarded by Army Research Office (ARO). The Government has certain rights in this invention.

BACKGROUND

The present invention generally relates to training artificial intelligence models, and more specifically, to distributed learning using an ensemble-based fusion approach.

Data mining involves the process of extracting value from a database or multiple databases. Databases can be separated by location and entities. Data mining uses computer-based algorithms, modeling techniques, data analysis tools, and machine-learning techniques to detect patterns and relationships within data. The advent of machine-learning techniques has enhanced the data mining process to include analysis and predictive results.

"Machine learning" generally describes a function of electronic systems that learn from data. In accelerated machine learning and cognitive science, artificial neural networks (ANNs) are one family of statistical learning models inspired by the biological neural networks of animals, and in particular the brain. ANNs can be used to estimate or approximate systems and functions that depend on a large number of inputs and are generally unknown. Other types of artificial intelligence models are also known including but not limited to decision trees, decision tables, support vector machines, clustering models, hidden Markov models, and Gaussian mixture models.

SUMMARY

Embodiments of the present invention are directed to a computer-implemented method for distributed learning with an ensemble-based approach. A non-limiting example of the computer-implemented method includes determining data statistics at each system node of a plurality of system nodes, wherein each system node respectively comprises an artificial intelligence model. The method further includes determining a set of control and coordination instructions for training each artificial intelligence model at each system node of the plurality of system nodes. The method further includes directing an exchange of data between the plurality of system nodes based on the data statistics of each system node of the plurality of system nodes. The method further includes fusing trained artificial intelligence models from the plurality of system nodes into a fused artificial intelligence model, wherein the trained artificial intelligence models are trained using the set of control and coordination instructions.

Embodiments of the present invention are further directed to a computer system for distributed learning. The computer system includes a memory and a hardware processor system communicatively coupled to the memory. The processor system is configured to perform the computer-implemented method.

Embodiments of the present invention are further directed to a computer program product for distributed learning. The computer product comprises a computer readable storage medium embodied with program instructions. The instructions are executable by a hardware processor; and cause the hardware processor to perform the computer-implemented method.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
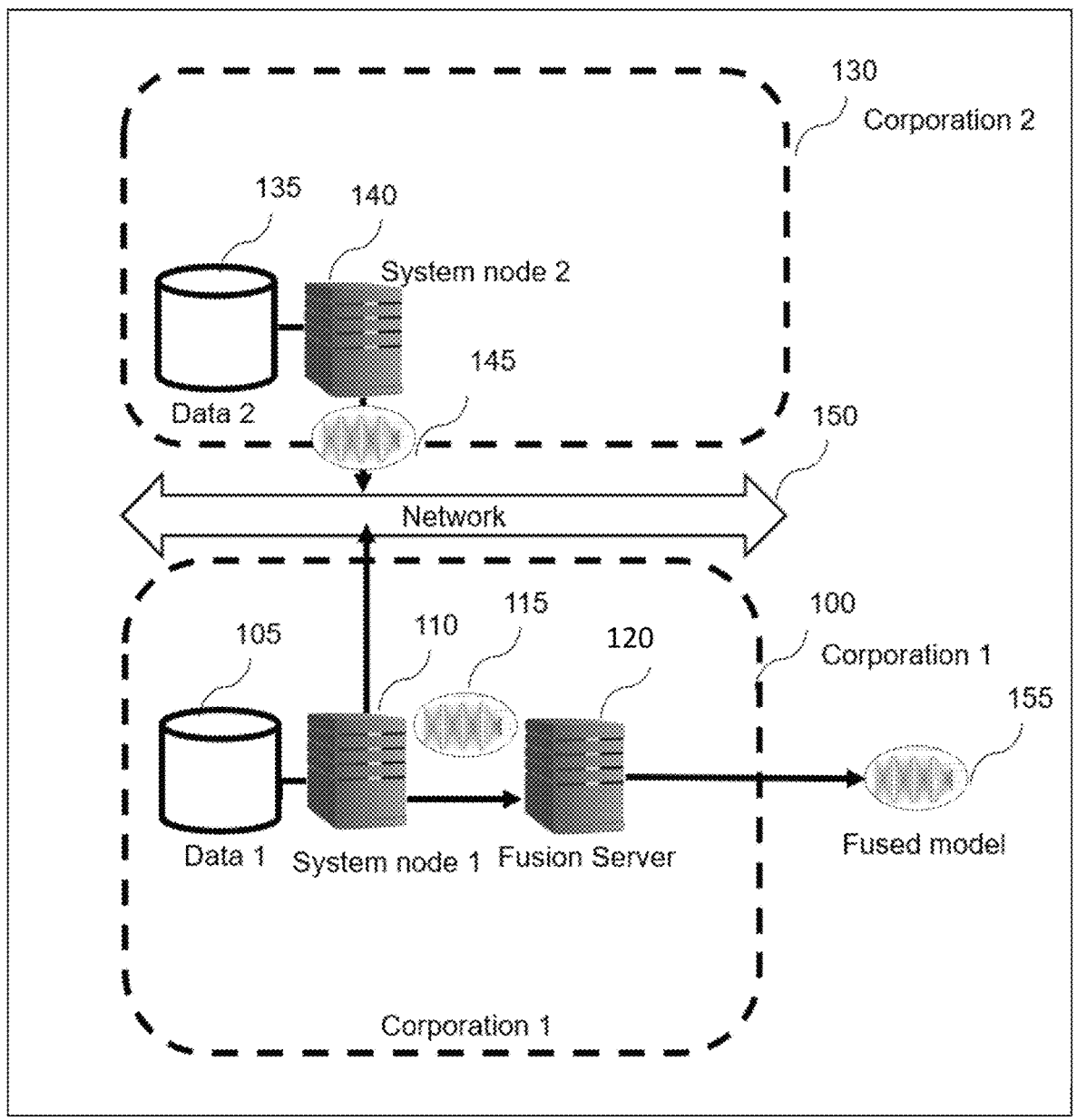
FIG. 1 depicts a diagram illustrating a process of generating a fused artificial intelligence model for use in implementing one or more embodiments of the present invention.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention. Neural networks are sets of algorithms and computer architecture that are patterned after biological nervous systems, such as the brain, in order to better process information. Neural networks receive images, sounds, and text as raw input data and through labeling or clustering techniques, the networks recognize patterns in the data to draw inferences and provide predictive outputs.

One example of a deep neural network architecture is a generative adversarial network (GAN). GANs utilize two neural networks, a generative network and a discriminative network, to compete with each other. The generative network inputs random data, including noise, and attempts to generate data across a desired probability distribution. The discriminative network inputs real data, including training data and discriminates between instances from the real data distribution and data produced by the generator. The generative network's objective is to cause the discriminative network to accept its generated data as real data. On the other hand, the discriminative network's objective is to recognize pattern differences between the real data and generated data to discern between the real and generated data.

In the era of neural networks and big data, massive amounts of data are separated by geographic location, financial considerations, and regulatory constraints. In order to mine the data for useful analytics, the conventional approach has been to transmit the data and or the neural network model from each node to a computing device at a centralized location to perform model training. However, this large-scale transmission of data can be prohibitively expensive and hampered by the need to maintain data integrity or comply with privacy policies. Additionally, this approach does not achieve good results when the data is skewed or partitioned. Partitioned data creates issues because not all data classes are present at each location. Skewed data creates issues because the data classes are distributed unevenly across different locations. If a system node does not contain a particular class of the data, the data received from this system node will lead the centralized computer to reach the wrong conclusion.

Conventional solutions to this dilemma do not allow for situations in which the models are heterogeneous (i.e., different locations wanting to train different respective models, and wanting to train their models in an independent environment). Embodiments of the subject invention provide methods and systems that work in heterogeneous environments which are not always connected, and thus in situations, in which the models are different.

As a specific example, FIG. 1 illustrates a situation, in which two sister corporations, 100 being corporation 1 and 130 being corporation 2 are connected together by the network 150. Although only two corporations and system nodes are presented, the number of corporations and system nodes in other embodiments can be a number greater than two. The first corporation 100 has training data 105 and can use a system node 110 to create a local AI model 115. The local AI model 115 may be a neural network in some embodiments, a decision tree in other embodiments, or a support vector machine in yet other embodiments. The second corporation 130 has training data 135 and can use a system node 140 to create a local AI model 145. Corporation 100 sends the local AI model 115 to a Fusion Server 120. The second corporation 130 sends the local AI model 145 to the Fusion Server 120, which performs the task of combining model 115 and model 145 to create a fused model 155. System node 1 110, system node 2 140, and the fusion server 120 can each be instances of processing system 200 described in FIG. 2.

In some situations, a first of two sister corporations may be trying to build an AI model, but it only has access to some training data which is under its own control. The AI would benefit from access to a larger set of training data that resides in the sister corporation. The training data for each corporation can be accessed via a locally present data server which controls access to the data and may transform the data before providing it to the requesting parties. While it would be useful for the corporations to have free access to all available set of data, it is frequently hard to get access to another corporation's data for a variety of reasons. These include large data size, limited network capabilities, corporate regulations, inter-corporation trust, and data quality, which are discussed in more detail below.

The size of data collected by different sister corporations can be very large. For example, corporations that collect network data may analyze and store terabytes of data per day. Even corporations that collect structured records about people and personnel may have data collected for hundreds of millions of individuals. The large data size can cause a challenge in moving data to a central location for the purpose of mining and building the appropriate AI model.

The networks that interconnect different sister corporations in many cases tend to be low bandwidth, usually in comparison to the size of the data that can be stored within each of the corporations. If the data is being collected in environments with limited connectivity, e.g. in remote areas covered only by satellite networks, collection of data into a central location for training may not be viable.

There may be regulatory prohibitions on the type and amount of data that can be shared among different sister corporations. Some types of data in a sister corporation may provide valuable information, but may be restricted from sharing with other sister corporations for reasons of privacy, constitutional rights, etc.

There may be a lack of trust in how the data is handled or managed among different corporations. While different corporations do cooperate with each other, the trust and cooperation may not be complete. As a result, some corporations may be hesitant to share data with the corporation that is building the machine learning model.

Different sister corporations may manage the data with different level of quality or fidelity, as far as the task of curating training data is concerned. While data may be available from many different corporations, the corporations may have collected the data for different purposes, so the way in which the data is maintained and stored may be very different. The data may not be in the format required by the sister corporation, or it may have a different labeling approach.

Turning now to an overview of the aspects of the invention, one or more embodiments of the invention address the above-described shortcomings of the prior art by providing a system that determines the statistical characteristics (for example, the fraction of data at each system node that is of a particular class) of data at each system node. The system includes a sequence of interconnected systems nodes and agents that in electrical connection with a fusion server. The fusion server is responsible for mediating a transfer of data samples between agents to resolve class imbalances, determines a random permutation order between the agents, mediating a transfer of models based upon the permutation order, and building an ensemble model from the locally trained models. The system nodes are any computing device that provides storage for respective local data. Each system node is coupled with an agent, which is a software algorithm that manages the sharing of local data statistics, performs model training, and shares trained models with the fusion server.

Each agent computes statistics of data distribution stored at its respective system node. The agents share these statistics with the fusion server, which in turn detects class imbalances at each system node. Using the class imbalance distribution, the fusion server determines which classes of data need to be shared by the agents in order for each system node to store each class of data. The fusion server also determines the permutation order for distribution of data based upon the aggregated statistical characteristics at the system nodes. The system causes each agent to create mini-batches of data to train an AI model by taking statistical characteristics into consideration. Once the agents have shared data from missing classes, this shared data can be used to resolve any class imbalances at the other system nodes.

The above-described aspects of the invention address the shortcomings of the prior art by directing mini-batches to be constructed containing a representative sample of all classes data to each system node. Instead of moving all of the data from each system node, the neural network model parameters can be moved and the neural networks at each system node can be trained using local data. This approach reduces the need to transfer large amounts of data between system nodes and eliminates gaps of class data at a particular system node location. The neural network model parameters are moved until each agent has the opportunity to train each neural network model with its own local data. In embodiments of the invention, a particular agent can choose to use only certain types of models for training from the options provided by the fusion server. This can be a result of system capabilities at a system node, regulatory concerns, on internal protocols.

Figure 2:
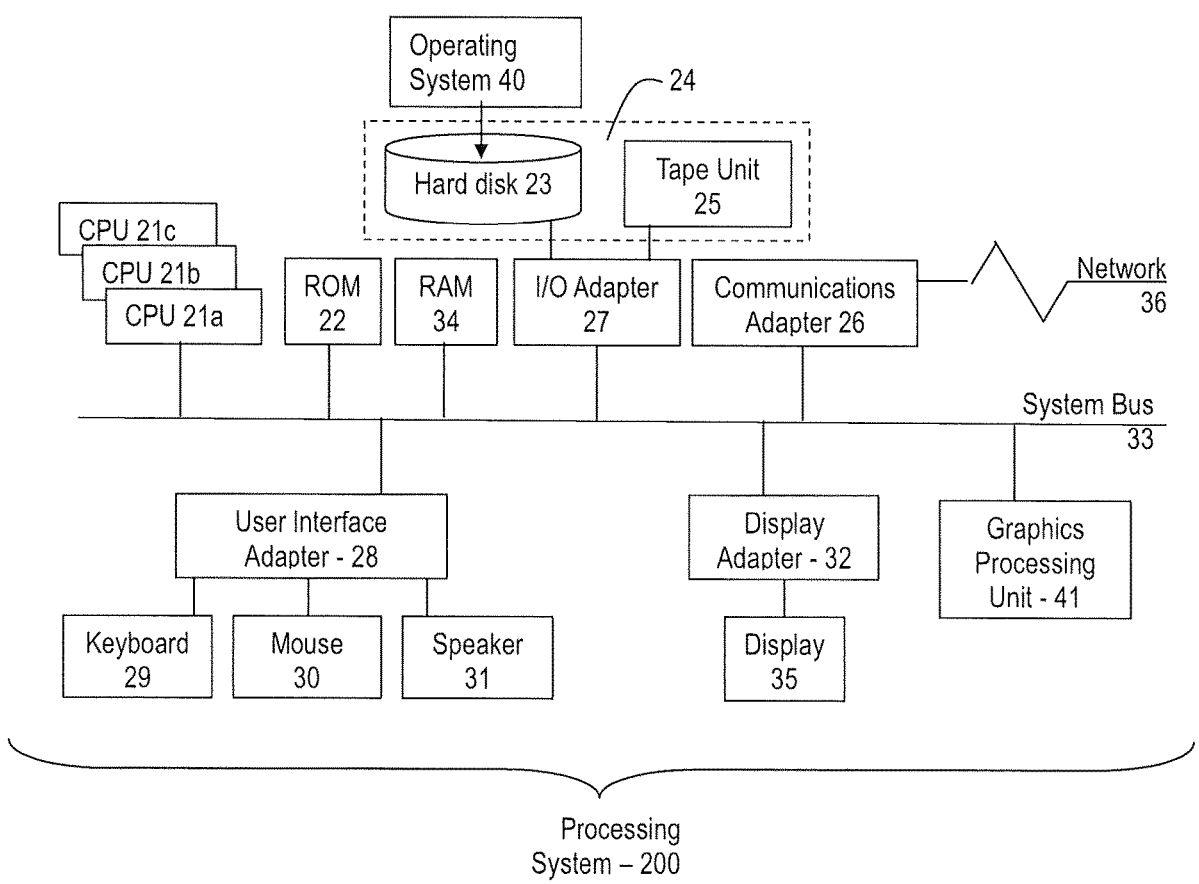
FIG. 2 depicts a block diagram of a computer system for use in implementing one or more embodiments of the present invention.

Turning now to a more detailed description of aspects of the present invention, Referring to FIG. 2, there is shown an embodiment of a processing system 200 for implementing the teachings herein. In this embodiment, the system 200 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 200.

FIG. 2 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 200 may be stored in mass storage 24. A network adapter 26 interconnects bus 33 with an outside network 36 enabling data processing system 200 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit In exemplary embodiments, the processing system 200 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel Thus, as configured in FIG. 2, the system 200 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 2.

Figure 3:
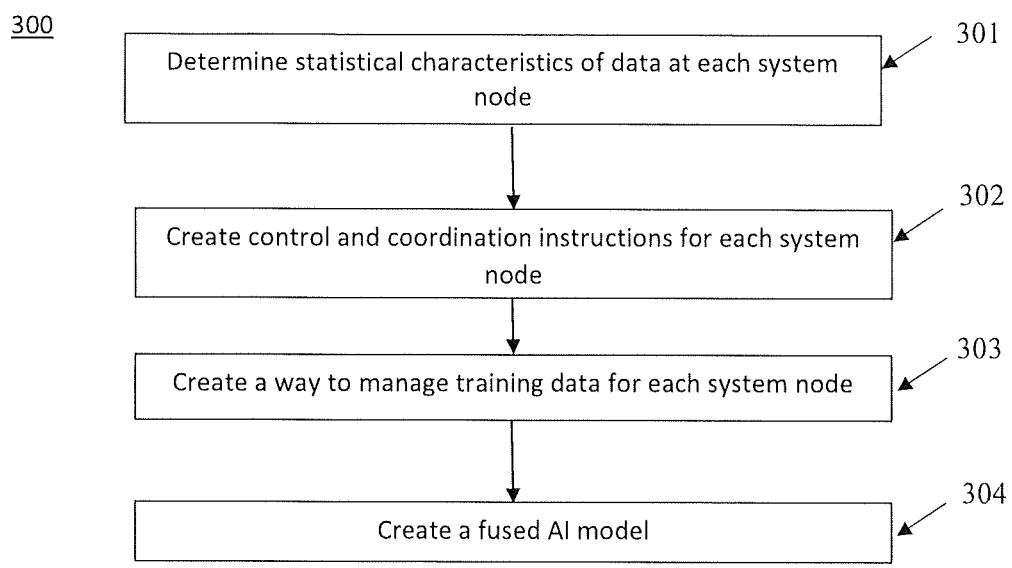
FIG. 3 depicts a flow diagram of a method for distributed learning according to one or more embodiments of the invention.

FIG. 3 depicts a flow diagram of a method for distributed learning 300 according to one or more embodiments of the invention. The method depicted in FIG. 3 can be implemented by one or more programmable computers, an example of which is the processing system 200 shown in FIG. 2. A fusion server (e.g., processing system 200) communicates with agents at respective system nodes to extract statistical data, including which classes of data are present and the instances of data for each class at each system node 301. The fusion server determines the overall statistics of the data that is distributed across all the system nodes, such as the fraction of training data at all nodes which belongs to each of a plurality of classes. The fusion server also determines parameters such as the size of a mini-batch that is used by the agents at each of the system nodes. The fusion server also determines the minimal instances of data from each class needed for a mini-batch.

For example, agent I has $C_i$ classes with a probability distribution $p_{i,k}$, for class k. The fusion server determines the aggregate data distribution over all of the system nodes. The overall distribution is described as $q_i$, for the $i^{th}$ class (i<=C). Each mini-batch contains a number of instances of each class such that the data is distributed as per qi for the $i^{th}$ class. The minimum number of instances for class I can be described as $q_i * B/K_i$, where $q_i$ is the overall distribution of class I, B is the mini-batch size, and Ki is the number of agents that have data of class I.

Referring to FIG. 3, the fusion server creates a set of control and coordination instructions for each agent at the system nodes 302. Such a set of control and coordination instructions may include a permutation order for moving the neural network models between system nodes for training. In some embodiments, the permutation order begins and ends with the system nodes that contain the highest number of classes of data. For example, a permutation order begins with the system node with the highest number of classes of data and ends with the system node with the second highest number of classes. The remaining system nodes are ordered such that system nodes with a lower number of classes are situated between system nodes with a higher number of classes. For example, the remaining system nodes can alternate between a system node with a high number of classes and a low number of classes. Ordering the system nodes in this manner reduces the opportunity for models at successive system nodes to be trained by the same replicated data, which can result in overfitting the data. The artificial intelligence models can include, but not limited to neural networks, decision trees, decision tables, support vector machines, clustering models, hidden Markov models, and Gaussian mixture models.

The set of control and coordination instructions may also include instructions on the exchange of the limited and targeted training data among different system nodes. In some embodiments, the exchange may be created so that each system node has a minimum amount of training data belonging to each class of data. In some embodiments, such data exchanges may require a representative 2% of the aggregate data for a respective class among the system nodes. In some embodiments, the instructions may include a mechanism for data exchange, e.g. summarize the data points using a clustering algorithm. In some embodiments, data exchange can occur through a generative model trained at one system node and transferred to other system nodes. Generative models can be trained as parameterized mixture models (e.g., Gaussian mixture models), or through generative adversarial training.

The set of control and coordination instructions may also include instructions on how a system node creates their mini-batches for training an AI model locally. The instructions may direct that each mini-batch be constructed so that they contain an equal number of data points from each class, including both data present locally and any data that was exchanged with other system nodes. In other embodiments, the instructions may direct that each mini-batch be constructed by sampling the training data (including local and shared data) closely approximates the overall distribution of classes in the training data. The mini-batches enables each agent to train its local model with same data classes and pass their respective model along to the next system node in the permutation order.

Each agent uses the mini-batches to train its local AI model. Depending on the instructions provided in step 302, the agent may train the AI model on one or more mini-batches, and then send the resulting AI model to the fusion server. The fusion server can then direct the model over to the next system node in the permutation sequence. At the end of the permutation order, the trained model is sent to the fusion server. The fusion server can create a way to manage training data for each system node 303.

In an embodiment, the agent can transfer the model to the next system node in a peer to peer manner. In another embodiment, the agent can transfer the model to the next system node using a protocol like a message queue. In another embodiment, the agent can transfer the model to the next system node indirectly via the fusion server, by sending the model using a web-based protocol to the fusion server, and the next agent retrieving the model using a web-based protocol.

The fusion server creates a fused AI model, and sends the fused AI model to each system node 304. In an embodiment, the fused AI model could be creating an ensemble model out of the models provided by the individual system nodes. In another embodiment, the fused AI model could be done by averaging the weights of all of the AI models provided by the system node and directing the system nodes to further train the fused AI-model using new mini-batches. In another embodiment, the fused model may be the best AI model provided by any of the system nodes, based on evaluating the models against a validation data maintained at the fusion server.

Figure 4:
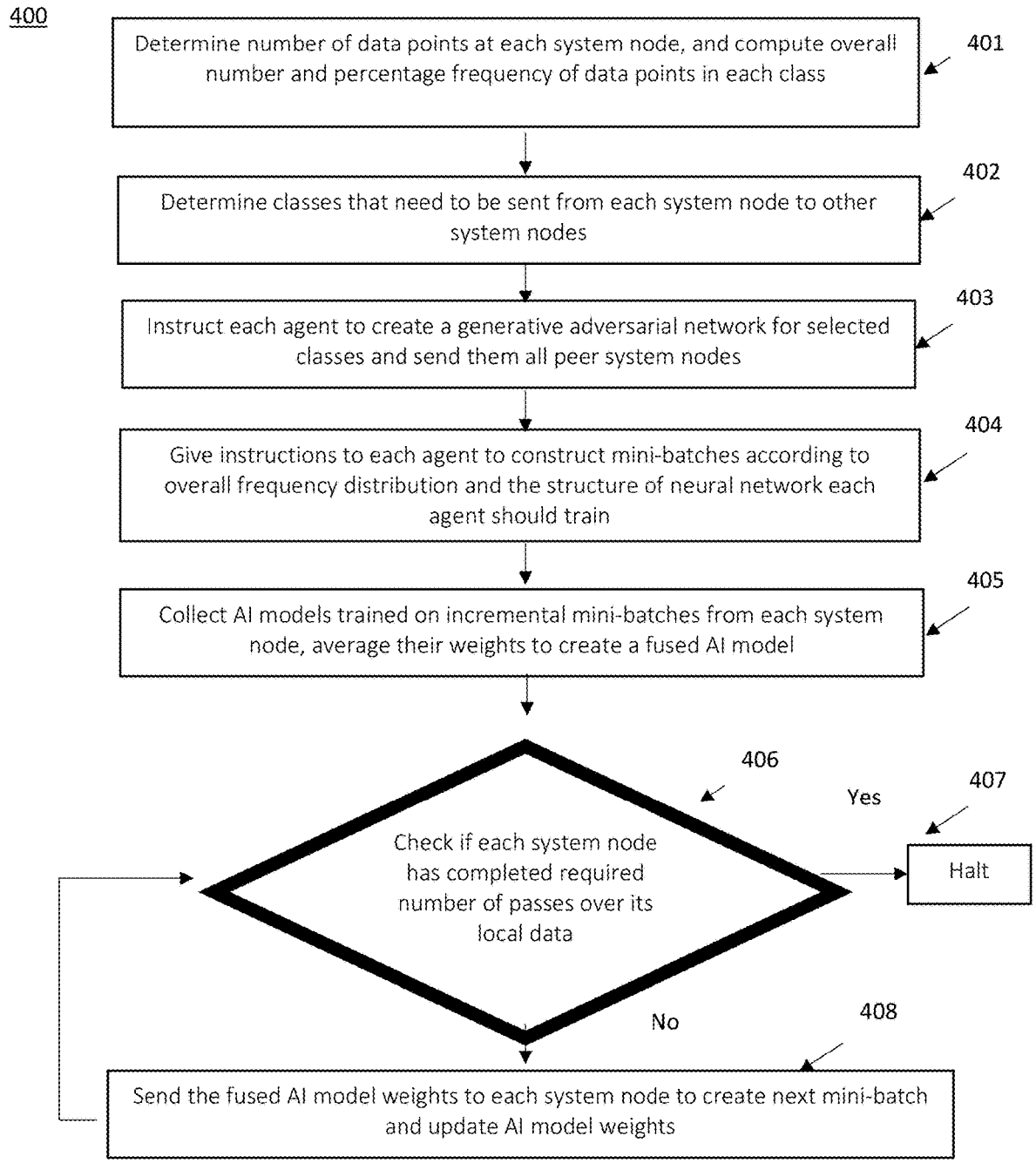
FIG. 4 depicts a flow diagram of a method for distributed learning according to one or more embodiments of the invention.

FIG. 4 depicts a flow diagram of a method for distributed learning 400 according to one or more embodiments of the invention. The fusion server can determine the number of data points at each system node and compute an overall number and percentage frequency of data points in each class 401. The fusion server can determine classes that need to be sent from each system node to other system nodes 402. Rather than or in addition to transmitting local data, the fusion server can instruct each agent to create a generative adversarial network for selected classes and send them to all peer system nodes 403. The fusion server can transmit instructions to each agent to construct mini-batches according to an overall frequency distribution and the structure of the artificial intelligence model each system node should train 404. The fusion server can collect intelligence models trained on incremental mini-batches from each system node and average their weights to create a fused artificial intelligence model 405. The fusion server can check if each agent has completed a required number of passes over its local data 406. If each agent has completed the required number of passes, the training can halt 407. If the agent has not completed the required number of passes, the fusion server can direct the fused intelligence model weights to each system node to create next mini-batch, update the model weights 408, and recheck the status of each agent 406.

Figure 5:
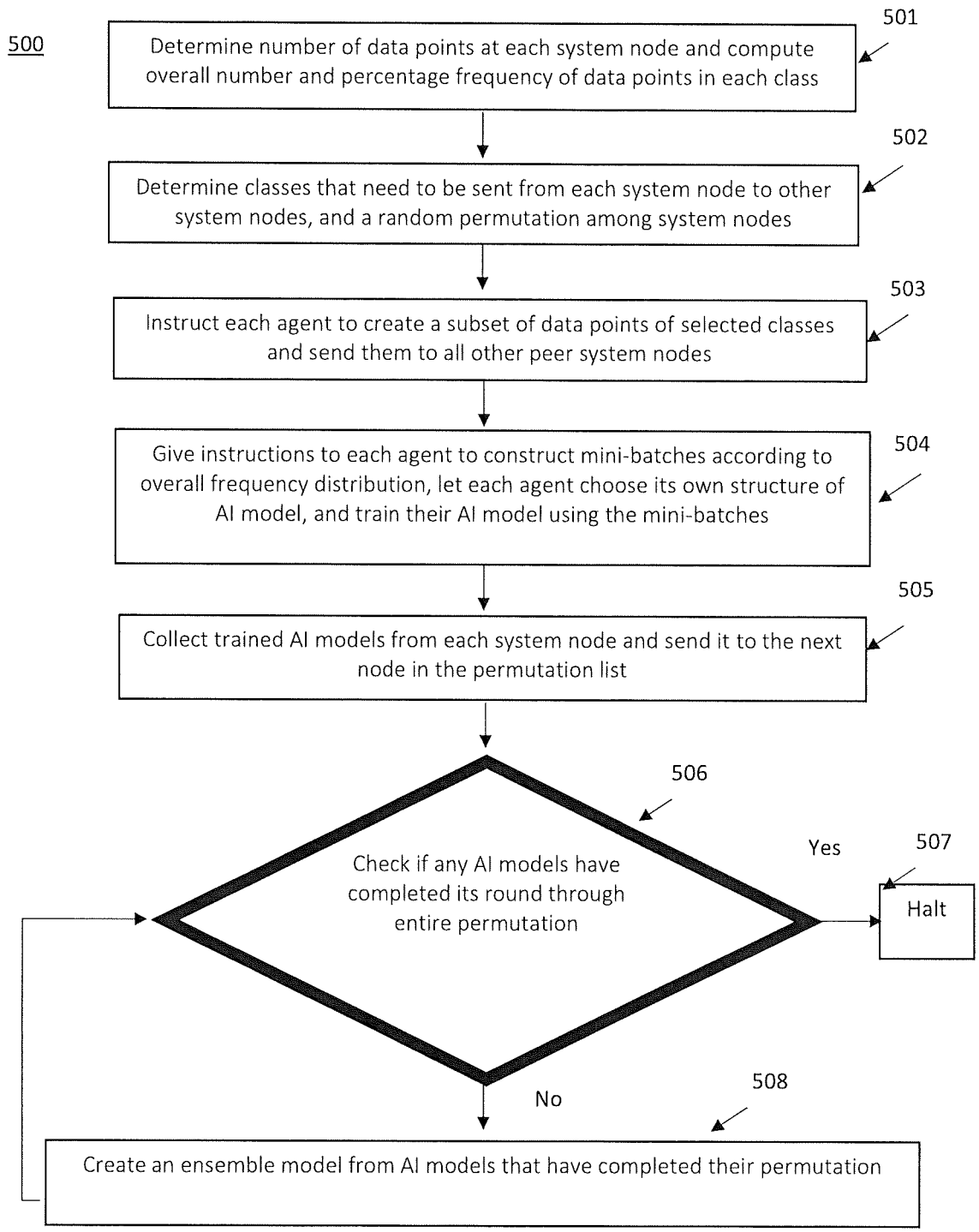
FIG. 5 depicts a flow diagram of a method for distributed learning according to one or more embodiments of the invention; and The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

FIG. 5 depicts a flow diagram of a method for distributed learning 500 according to one or more embodiments of the invention. The fusion server can determine the number of data points at each system node and compute an overall number and percentage frequency of data points in each class 501. The fusion server can determine classes that need to be sent from each system node to other system nodes, and a random permutation among system nodes 502. The fusion server can instruct each agent to create a subset of data points of selected classes and send them to all other peer system nodes 503. The fusion server can transmit instructions to each agent to construct mini-batches according to overall frequency distribution, let each agent choose its own structure of artificial intelligence model, and train their artificial intelligence models using the mini-batches 504. The fusion server can collect trained intelligence models from each system node and send it to the next node in the permutation list 505. The fusion server can check if any artificial intelligence models have completed its round through entire permutation order 506. If any artificial intelligence model has passed through the entire permutation order, the training can halt 507. If the agent has not completed the required number of passes, the fusion server can create an ensemble model from artificial intelligence models that have completed their permutation 508 and recheck the status of each artificial intelligence model 506.

Additional processes may also be included. It should be understood that the processes depicted in FIG. 3, FIG. 4, and FIG. 5 represent illustrations, and that other processes may be added, or existing processes may be removed, modified, or rearranged without departing from the scope and spirit of the present disclosure.

In embodiments of the invention, the process generally works as a client server model. An agent can be downloaded from a server and each agent interacts with the server. The independent system nodes can have a different set of local training data and are connected to each other through a network.

The fusion server controls the time of execution at each system node and enables the agents to access data located at other system nodes. This allows the fusion server to instruct all the agents to run their training processes at the same time, incrementally build the model, and enable the agents to access the data from each other. The server can also control how the agents communicate with the server. As per these instructions, each agent can train a local model completely, and share that model with the fusion server.

In some embodiments of the invention, each agent is scheduled to run at the same time as the fusion server. The fusion server decides on the type of model that is to be trained by each of the agents. Each agent uses the same type of artificial intelligence model with the same hyper-parameters for training. Each agent constructs the mini-batch as per instructions of the fusion server, and trains the model with the mini-batch.

This synchronized approach works on machine learning models that use stochastic gradient descent with an additive loss function, i.e. the measure of error from the learned model against given data points. In effect, each agent computes the model parameters to best fit their data, and the loss from the different agents can be averaged at the fusion server to determine the right parameters.

In some embodiments of the invention, the system nodes are not allowed to synchronize their model building process over every mini-batch. Instead, each agent can train their model with the mini-batch and a local data set. This situation may arise in environments where an agency managing a system node may not be willing to open its local systems to download and run the software, but is willing to take a model specification, and run it locally on local data.

In embodiments of the invention, an agent can employ a clustering algorithm to generate missing class data. There are a variety of clustering and bi-clustering algorithms that can be used for this purpose. These algorithms include, but are not limited to K-means, affinity propagation, spectral clustering, hierarchal clustering, agglomerative clustering, Gaussian mixtures, and birch clustering. The clustering algorithms extract features from similar instances of data to generate or replicate class data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for distributed learning, the method comprising:

determining, by a server, data statistics at each system node of a plurality of system nodes, wherein each system node respectively comprises an artificial intelligence model, wherein the data statistics indicate classes of data stored by each system node, and wherein the server is configured to detect a class imbalance based on the data statistics indicating one or more missing classes of data at one or more given system nodes and to determine which missing class of data needs to be exchanged in order for each system node to store each class of data necessary to resolve the class imbalance;

determining, by the server, a set of control and coordination instructions for training each artificial intelligence model at each system node of the plurality of system nodes, the control and coordination instructions including data exchange instructions to facilitate an exchange of data to provide the given system nodes with the missing class of data, and mini-batch instructions instructing each system node itself to create a local mini-batch that contains a representative sample of all classes of data of each system node among the plurality of system nodes;

transmitting, by the server, instructions to each system node of the plurality of system nodes to create a generative adversarial network for selected classes of data;

directing, by the server, an exchange of data between the plurality of system nodes based on the data statistics of each system node of the plurality of system nodes, wherein the exchanged data includes data created by each generative adversarial network;

directing, by the server, each of the system nodes to train an artificial intelligence model stored by a respective system node using the local mini-batch created by the respective system node; and fusing, by the server, trained artificial intelligence models from the plurality of system nodes into a fused artificial intelligence model, wherein the trained artificial intelligence models are trained using the set of control and coordination instructions, wherein determining the set of control and coordination instructions includes determining a permutation of order that the artificial intelligence models are trained, and wherein determining a permutation of order includes:
  determining a number of classes of each system node among the plurality of system nodes;
  determining a starting system node having a highest number of classes among the plurality of system nodes and an ending system node having a second highest number of classes among the plurality of system nodes; and
  ordering remaining system nodes having a number of classes less than the second highest number of classes between the starting system node and the ending system node according to the number of classes of each remaining system node.

2. The computer-implemented method of claim 1, wherein the set of control and coordination instructions includes trains the artificial intelligence models according to the permutation of order.

3. The computer-implemented method of claim 1, wherein the set of control and coordination instructions includes a direction for an exchange of training data between system nodes of the plurality of system nodes.

4. The computer-implemented method of claim 1, wherein each artificial intelligence model at each system node of the plurality of system nodes includes a neural network, a decision tree, a rule set, a support vector machine, a Gaussian mixture model, or a clustering model.

5. The computer-implemented method of claim 1, wherein an artificial intelligence model at a first system node of the plurality of system nodes is different than an artificial intelligence model at a second system node of the plurality of system nodes.

6. The computer-implemented method of claim 1 further comprising:
  directing all system nodes of the plurality of system nodes to respectively use a same artificial intelligence model;
  averaging artificial intelligence parameters, received from the plurality of system nodes, derived by training with the mini-batches and localized data to create the fused artificial intelligence model; and
  directing each system node of the plurality of system nodes to use a same set of data statistics for training.

7. The computer-implemented method of claim 1, further comprising creating an ensemble of artificial intelligence models to create the fused artificial intelligence model.

8. The computer-implemented method of claim 1, wherein exchanging data comprises:
  generating a class of data through a clustering algorithm at a first system node; and
  transferring the generated data to a second system node.

9. A system for distributed learning comprising:
a processor communicatively coupled to a memory, the processor configured to:
  determine data statistics at each system node of a plurality of system nodes, wherein each system node respectively comprises an artificial intelligence model, wherein the data statistics indicate classes of data stored by each system node, and wherein the server is configured to detect a class imbalance based on the data statistics indicating one or more missing classes of data at one or more given system nodes and to determine which missing class of data needs to be exchanged in order for each system node to store each class of data necessary to resolve the class imbalance;
  determine a set of control and coordination instructions for training each artificial intelligence model at each system node of the plurality of system nodes, the control and coordination instructions including data exchange instructions to facilitate an exchange of data to provide the given system nodes with the missing class of data, and mini-batch instructions instructing each system node itself to create a local mini-batch that contains a representative sample of all classes of data of each system node among the plurality of system nodes;
  transmit instructions to each system node of the plurality of system nodes to create a generative adversarial network for selected classes of data;
  direct an exchange of data between the plurality of system nodes based on the data statistics of each system node of the plurality of system nodes, wherein the exchanged data includes data created by each generative adversarial network;
  direct each of the system nodes to train an artificial intelligence model stored by a respective system node using the local mini-batch created by the respective system node; and
  fuse trained artificial intelligence models from the plurality of system nodes into a fused artificial intelligence model, wherein the trained artificial intelligence models are trained using the set of control and coordination instructions,
  wherein the set of control and coordination instructions includes a permutation of order that the artificial intelligence models are trained, and wherein the permutation of order includes:
    a number of classes of each system node among the plurality of system nodes;
    a starting system node having a highest number of classes among the plurality of system nodes and an ending system node having a second highest number of classes among the plurality of system nodes; and
    remaining system nodes having a number of classes less than the second highest number of classes between the starting system node and the ending system node ordered according to the number of classes of each remaining system node.

10. The system of claim 9, wherein the set of control and coordination instructions includes trains the artificial intelligence models according to the permutation of order.

11. The system of claim 9, wherein the set of control and coordination instructions includes a direction for an exchange of training data between system nodes of the plurality of system nodes.

12. The system of claim 9, wherein the set of control and coordination instructions further include:
  directing all system nodes of the plurality of system nodes to respectively use a same artificial intelligence model;
  averaging artificial intelligence parameters, received from the plurality of system nodes, derived by training with the mini-batches and localized data to create the fused artificial intelligence model; and
  directing each system node of the plurality of system nodes to use a same set of data statistics for training.

13. The system of claim 9, wherein each artificial intelligence model at each system node of the plurality of system nodes includes a neural network, a decision tree, a rule set, a support vector machine, a Gaussian mixture model, or a clustering model.

14. The system of claim 9, wherein an artificial intelligence model at a first system node of the plurality of system nodes is different than an artificial intelligence model at a second system node of the plurality of system nodes.

15. A computer program product for distributed learning, the computer product comprising a computer readable storage medium having program instructions embodied therewith, the instructions executable by a processor to cause the processor to:
   determine data statistics at each system node of a plurality of system nodes, wherein each system node respectively comprises an artificial intelligence model, wherein the data statistics indicate classes of data stored by each system node, and wherein the server is configured to detect a class imbalance based on the data statistics indicating one or more missing classes of data at one or more given system nodes and to determine which missing class of data needs to be exchanged in order for each system node to store each class of data necessary to resolve the class imbalance;
   determine a set of control and coordination instructions for training each artificial intelligence model at each system node of the plurality of system nodes, the control and coordination instructions including data exchange instructions to facilitate an exchange of data to provide the given system nodes with the missing class of data, and mini-batch instructions instructing each system node itself to create a local mini-batch that contains a representative sample of all classes of data of each system node among the plurality of system nodes;
   transmit instructions to each system node of the plurality of system nodes to create a generative adversarial network for selected classes of data;
   direct an exchange of data between the plurality of system nodes based on the data statistics of each system node of the plurality of system nodes, wherein the exchanged data includes data created by each generative adversarial network;
   direct each of the system nodes to train an artificial intelligence model stored by a respective system node using the local mini-batch created by the respective system node; and
   fuse trained artificial intelligence models from the plurality of system nodes into a fused artificial intelligence model, wherein the trained artificial intelligence models are trained using the set of control and coordination instructions,
   wherein the set of control and coordination instructions includes a permutation of order that the artificial intelligence models are trained, and wherein the permutation of order includes:
      a number of classes of each system node among the plurality of system nodes;
      a starting system node having a highest number of classes among the plurality of system nodes and an ending system node having a second highest number of classes among the plurality of system nodes; and
      remaining system nodes having a number of classes less than the second highest number of classes between the starting system node and the ending system node ordered according to the number of classes of each remaining system node.

16. The computer program product of claim 15, wherein the set of control and coordination instructions includes trains the artificial intelligence models according to the permutation of order.

17. The computer program product of claim 15, wherein the set of control and coordination instructions includes a direction for an exchange of training data between system nodes of the plurality of system nodes.

18. The computer program product of claim 15, wherein each artificial intelligence model at each system node of the plurality of system nodes includes a neural network, a decision tree, a rule set, a support vector machine, a Gaussian mixture model, or a clustering model.

19. The computer program product of claim 15, wherein an artificial intelligence model at a first system node of the plurality of system nodes is different than an artificial intelligence model at a second system node of the plurality of system nodes.

* * * * *